United States Patent

Moriguchi et al.

[11] Patent Number: 5,877,952
[45] Date of Patent: Mar. 2, 1999

[54] POWER SUPPLY APPARATUS WITH INITIAL ARCING SUSTAINING CIRCUIT

[75] Inventors: Haruo Moriguchi, Itami; Kenzo Danjo, Soraku-gun; Shigeru Okamoto, Hirakata; Atsushi Kinoshita, Osaka; Takashi Hashimoto, Kobe, all of Japan

[73] Assignee: Sansha Electric Manufacturing Co., Limited, Osaka, Japan

[21] Appl. No.: 954,816

[22] Filed: Oct. 21, 1997

[30] Foreign Application Priority Data

Nov. 5, 1996 [JP] Japan .................................. 8-310164

[51] Int. Cl.$^6$ ...................................................... H02M 7/00
[52] U.S. Cl. ........................................ 363/101; 219/130.4
[58] Field of Search ........................... 219/130.4, 130.33, 219/130.01; 363/37, 49, 79, 101; 307/59

[56] References Cited

U.S. PATENT DOCUMENTS

| | | | |
|---|---|---|---|
| 4,517,439 | 5/1985 | Colley | 323/262 |
| 4,876,433 | 10/1989 | Kashima et al. | 219/130.4 |
| 4,897,522 | 1/1990 | Bilczo et al. | 219/130.32 |
| 5,444,356 | 8/1995 | Reynolds et al. | 323/282 |

FOREIGN PATENT DOCUMENTS

| | | |
|---|---|---|
| 0 719 612 A1 | 7/1996 | European Pat. Off. . |
| 2 302 620 | 1/1997 | United Kingdom . |

*Primary Examiner*—Shawn Riley
*Attorney, Agent, or Firm*—William H. Murray, Esq.

[57] ABSTRACT

Power supply apparatus includes a converter which converts a commercial AC voltage into a DC voltage. An inverter converts the DC voltage into a high frequency voltage. The high frequency voltage is voltage-transformed by a transformer, and then rectified and smoothed by a rectifier and a smoothing reactor into a DC voltage. This DC voltage is applied between a workpiece and a torch. A high frequency voltage generator generates a high frequency voltage and applies it to a primary winding of a coupling transformer. A boosted high frequency voltage is induced in a first secondary winding and applied between the workpiece and the torch, so that arcing is initiated. The coupling transformer includes a second secondary winding in which another high frequency voltage is induced. The high frequency voltage induced in the second secondary winding is converted into a DC voltage by a diode and a smoothing capacitor for application between the workpiece and the torch, so that the arcing is sustained.

6 Claims, 2 Drawing Sheets

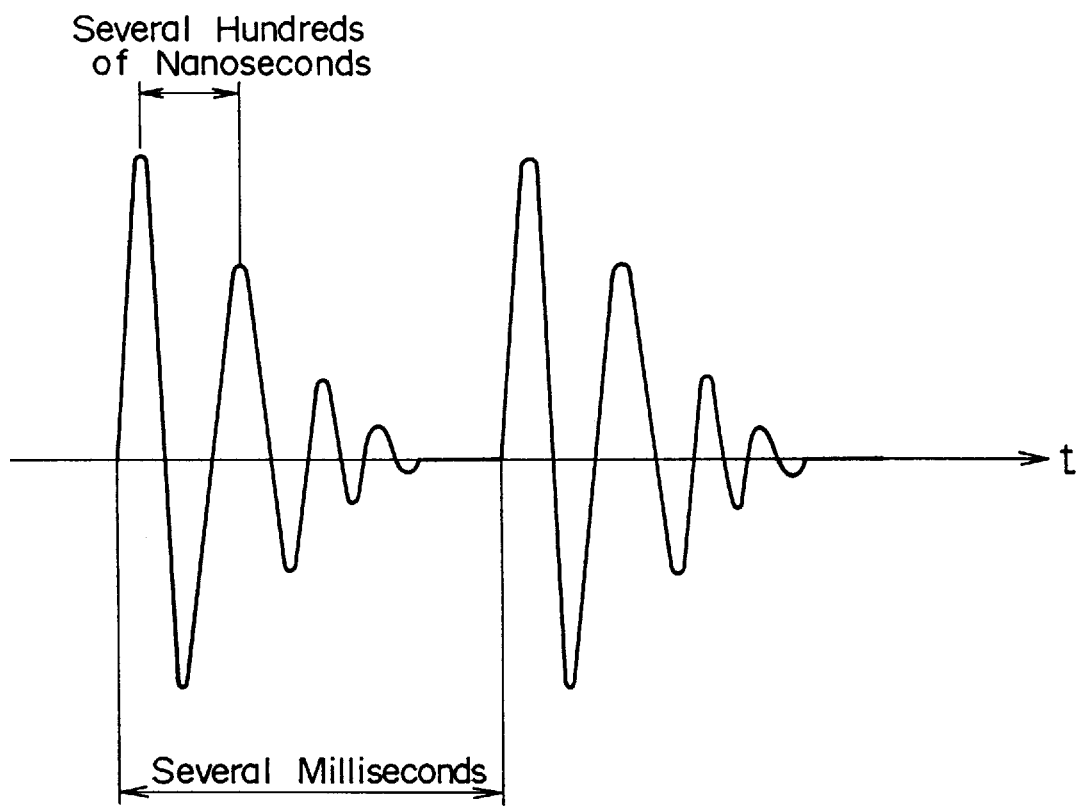
F I G . 2

POWER SUPPLY APPARATUS WITH INITIAL ARCING SUSTAINING CIRCUIT

This application is based on Japanese Patent Application No. HEI 8-310164 filed on Nov. 5, 1996, which is incorporated hereinto by reference.

This invention relates to power supply apparatus used with e.g. a DC arc cutter or a DC arc welder, and, in particular, to such power supply apparatus having an initial arcing sustaining circuit for sustaining DC arcing which is initiated by the power supply apparatus, until the power supply apparatus can sustain arcing by itself.

BACKGROUND OF THE INVENTION

In one of conventional power supply apparatus used with a DC arc cutter or a DC arc welder, an AC voltage from a commercial voltage source is converted into a DC voltage in a converter, and the DC voltage is applied to an inverter for conversion into a high frequency voltage. The high frequency voltage is, then, voltage-transformed by a transformer, and then rectified and smoothed by a rectifier and a smoothing reactor into a DC voltage. The resulting DC voltage is applied between two output terminals respectively connected to a workpiece to be wrought and to a torch of the DC arc cutter or welder.

A detector detects the voltage appearing between the output terminals. Alternatively, the detector may detect current flowing through either one of the terminals. In accordance with the detected voltage or current, a controller controls the inverter in such a manner that the voltage or the current can be kept constant.

An arc cannot be generated between the torch and a workpiece by applying therebetween the DC voltage alone which is developed through the rectifier and the smoothing reactor. Therefore, an arc initiating circuit is used to initiate an arc between the torch and the workpiece. The arc initiating circuit includes a high frequency generator for generating a high frequency voltage, which is coupled to a primary winding of a coupling transformer to induce a high frequency voltage in a secondary winding of the coupling transformer. The induced high-frequency voltage is applied between the torch and the workpiece via a bypass capacitor, thereby initiating arcing. The arcing is sustained by power supplied through the rectifier and the smoothing reactor.

The smoothing reactor may have large reactance to stabilize the DC voltage to be applied between the output terminals. Such large reactance, however, results in failure to sustain the arcing because it impedes an arc sustaining current flowing from the rectifier through the smoothing reactor.

Power supply apparatus according to the present invention can overcome the problem described above.

SUMMARY OF THE INVENTION

Power supply apparatus according to the present invention includes inverter means for converting a DC voltage into a high frequency voltage, transformer means for voltage-transforming the high frequency voltage applied thereto from the inverter means, and first converting means for converting the voltage-transformed voltage into a DC voltage. The DC voltage from the first converting means is applied between two output terminals. A high frequency voltage superposing path is coupled between the two output terminals. The power supply apparatus also includes high frequency voltage generating means, a coupling transformer having a primary winding and a first secondary winding, and voltage boosting means. The primary winding of the coupling transformer receives a high frequency voltage from the high frequency voltage generating means. The first secondary winding is coupled in the high frequency voltage superposing path. The voltage boosting means boosts the high frequency voltage provided by the high frequency voltage generating means. Second converting means associated with the voltage boosting means converts the boosted high frequency voltage into a DC voltage for application between the output terminals.

The voltage boosting means may be a second secondary winding of the coupling transformer.

The second converting means may provide a DC voltage higher than the DC voltage from the first converting means.

The high frequency voltage generating means may stop providing the high frequency voltage when arc current flows between the output terminals.

The first converting means may comprise rectifier means for rectifying the high frequency voltage from the transformer means, and a smoothing reactor for smoothing the output of the rectifier means.

BRIEF DESCRIPTION OF THE DRAWINGS

FIG. 2 shows waveform of a high frequency voltage generated by the high frequency generator shown in FIG. 1.

DETAILED DESCRIPTION OF PREFERRED EMBODIMENT

Figure 1:
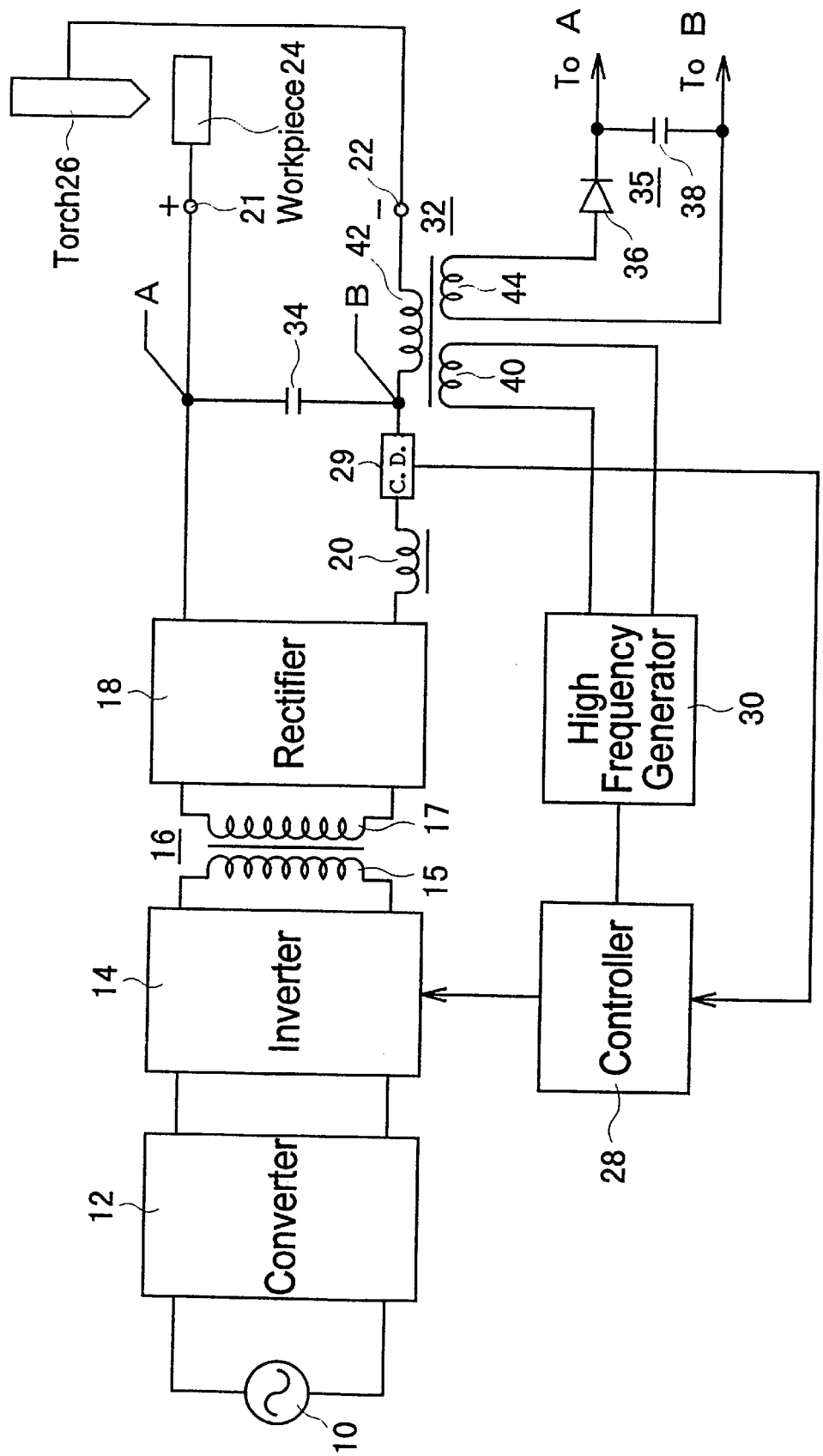
FIG. 1 is a block diagram of an arc welder with power supply apparatus having an initial arcing sustaining circuit according to one embodiment of the present invention.

Power supply apparatus according to an embodiment of the present invention as used with a DC arc welder is explained below with reference to the attached FIGS. 1 and 2.

As shown in FIG. 1, the power supply apparatus of the present invention has a converter 12. The converter 12 converts a commercial AC voltage supplied from e.g. a commercial three-phase or single-phase AC voltage source 10, into a DC voltage. The converter 12 includes a rectifying circuit and a smoothing capacitor as is well-known.

The converter 12 applies the DC voltage to a high frequency inverter 14. The high frequency inverter 14 includes a plurality of semiconductor switching elements for converting a DC voltage applied thereto into a high frequency voltage. The semiconductor switching elements are ON-OFF controlled as described below. The switching elements may be, for example, insulated gate bipolar transistors, power FETs, or power bipolar transistors.

The inverter 14 converts the DC voltage applied thereto from the converter 12 into a high frequency voltage and applies the high frequency voltage to a primary winding 15 of an insulating transformer 16. A voltage-transformed high frequency voltage is induced in a secondary winding 17 of the transformer 16, which is then rectified by a rectifier 18. The rectifier 18 may be e.g. a full-wave rectifying circuit or a half-wave rectifying circuit. The output voltage of the rectifier 18 is applied between output terminals 21 and 22 through a smoothing reactor 20. The smoothing reactor 20 has large reactance so as to sufficiently smooth the DC voltage to be applied between the output terminals 21 and 22. The DC voltage applied between the output terminals 21 and 22 is typically several tens of volts.

The output terminal 21 is coupled to a workpiece 24 to be wrought, and the output terminal 22 is coupled to a torch 26.

The semiconductor switching elements of the inverter 14 are ON-OFF controlled by a controller 28. The controller 28 provides pulse width modulation (PWM) control. For example, a current detector (C.D.) 29 detects an arc (DC) current flowing between the torch 26 and the workpiece 24, and the controller 28 PWM controls the switching elements of the inverter 14 in accordance with the detected arc current in such a manner that the arc current can be maintained at a predetermined value. Alternatively, a voltage detector (not shown) may be used to detect the voltage between the output terminals 21 and 22, and the controller 28 PWM controls the switching elements of the inverter 14 in accordance with the detected voltage in such a manner that a predetermined constant voltage is developed between the output terminals 21 and 22.

The power supply apparatus of the present invention also includes an arc initiating circuit. The arc initiating circuit has a high frequency generator 30. The high frequency generator 30 generates a high frequency voltage in response to a START signal from the controller 28. As shown in FIG. 2, the high frequency voltage includes plural series of cycles of damping amplitudes. One cycle has a period of several hundreds of nanoseconds, and one series of such cycles has a period of several milliseconds. The high frequency voltage continues to be developed until a STOP signal is applied to the generator 30 from the controller 28.

The high frequency voltage from the generator 30 is applied to a primary winding 40 of a coupling transformer 32, whereby a boosted high frequency voltage is induced in a first secondary winding 42 of the coupling transformer 32. The ratio in number of turns between the primary winding 40 and the first secondary winding 42 is so determined that a boosted high frequency voltage of e.g. several kilovolts can be induced in the first secondary winding 42. The first secondary winding 42 is connected in series with a bypass capacitor 34, and this series connection is coupled between the output terminals 21 and 22 to apply the boosted high frequency voltage therebetween. The bypass capacitor 34 serves as a high frequency voltage superposing path through which the boosted high frequency voltage is applied between the output terminals 21 and 22, while preventing current based on the boosted high frequency voltage from flowing into the rectifier 18 and the secondary winding 17 of the transformer 16.

The coupling transformer 32 also has voltage boosting means, e.g. a second secondary winding 44 in which a boosted high frequency voltage is induced when the primary winding 40 receives the high frequency voltage from the generator 30. This boosted high frequency voltage is converted into a DC voltage by an AC-to-DC converting circuit 35 including a diode 36 and a smoothing capacitor 38. Specifically, the boosted high frequency voltage across the winding 44 is half-wave rectified by a half-wave rectifying circuit formed by the diode 36, and then smoothed by the smoothing capacitor 38. The half-wave rectifying circuit may be replaced by e.g. a full-wave rectifying circuit or a voltage doubler rectifying circuit. In some cases, the AC-to-DC converting circuit 35 may be formed without the smoothing capacitor 38.

The ratio in number of turns between the primary winding 40 and the second secondary winding 44 is so selected that the boosted high frequency voltage in the second secondary winding 44 can be converted into a DC output voltage of several hundreds of volts by the AC-to-DC converting circuit 35. The voltage across the smoothing capacitor 38 is applied across the bypass capacitor 34, as indicated by arrows A and B.

The voltage across the smoothing capacitor 38 vanishes when the high frequency generator 30 is stopped. The high frequency generator 30 is stopped by the controller 28 when the current detector 29 detects an arc current large enough to sustain arcing flowing through the reactor 20.

In operation of a DC arc welder with the power supply apparatus with the above-described arrangement, an AC voltage from the commercial AC voltage source 10 is converted into a DC voltage by the converter 12. The DC voltage is converted into a high frequency voltage by the inverter 14. The high frequency voltage is then voltage-transformed by the transformer 16, rectified by the rectifier 18, and smoothed by the smoothing reactor 20 for application between the output terminals 21 and 22. The torch 26 and the workpiece 24, however, have a gap therebetween, so that arc is not generated.

Then, a start switch (not shown) is turned on to operate the controller 28. The controller 28 drives the high frequency generator 30 to generate a high frequency voltage. The high frequency voltage from the generator 30 is applied to the primary winding 40 of the coupling transformer 32, so that a boosted high frequency voltage is induced in the first secondary winding 42 of the coupling transformer 32. The induced voltage is coupled between the output terminals 21 and 22 via the bypass capacitor 34, and, hence, between the workpiece 24 and the torch 26, and arc is generated therebetween.

The arcing between the workpiece 24 and the torch 26 causes arc current to start to flow from the rectifier 18. In this initial stage, however, the arc current is not large enough to sustain arcing because the smoothing reactor 20 has large reactance.

It should be noted, however, that the high frequency voltage generated by the generator 30 induces a boosted high frequency voltage in the second secondary winding 44 as well as in the first secondary winding 42. The voltage induced in the second secondary winding 44 is rectified by the diode 36 and smoothed by the smoothing capacitor 38. Typically, a DC voltage of several hundreds of volts is generated across the smoothing capacitor 38, while the DC voltage applied from the rectifier 18 and the smoothing reactor 20 is several tens of volts. Thus, the AC-to-DC converting circuit 35 applies, between the torch 26 and the workpiece 24, a DC voltage which is about ten times as high as the DC voltage from the rectifier 18 and the smoothing reactor 20.

This high DC voltage causes current larger than the current supplied from the rectifier 18 to flow between the torch 26 and the workpiece 24, to thereby sustain the arcing. Then, the current detector 29 detects this large current and causes the controller 28 to stop the high frequency generator 30. This causes the voltage across the smoothing capacitor 38 to vanish. By this point of time, however, the current from the rectifier 18 supplied between the torch 26 and the workpiece 24 has become large enough to sustain the arcing.

As described above, according to the present invention, arcing can be sustained even if the smoothing reactor 20 is too large to allow a sufficiently large arc current to flow from the rectifier 18 at the time of starting the DC arc welder.

In the described embodiment, the voltage across the smoothing capacitor 38 can be removed by stopping the high frequency generator 30 through the controller 28, and, therefore, no dedicated switch is required for generating or removing the voltage across the smoothing capacitor 38.

In the described embodiment, the boosted high frequency voltage to be applied across the capacitor 34 for sustaining the arcing in the initial operating stage is derived by rectifying and smoothing the voltage induced across the second secondary winding 44 of the coupling transformer 32, but it may be derived by rectifying and smoothing a voltage induced across a secondary winding of a separate transformer having a primary winding across which the high frequency voltage from the generator 30 is applied. However, this alternative makes the structure of the power supply apparatus more complicated.

The voltage across the smoothing capacitor 38 may be applied between the output terminals 21 and 22, instead of being applied across the bypass capacitor 34.

The power supply apparatus of the present invention can be used with a DC arc cutter as well as a DC arc welder.

What is claimed is:

1. A power supply apparatus comprising:

inverter means for converting a first DC voltage into a high frequency voltage;

transformer means for voltage-transforming said high frequency voltage;

first converting means for converting the voltage-transformed high frequency voltage into a second DC voltage;

two output terminals between which the second DC voltage from said first converting means is applied;

a high frequency voltage superposing path coupled between said output terminals;

high frequency voltage generating means;

a coupling transformer having a primary winding and a first secondary winding, said primary winding receiving a high frequency voltage from said high frequency voltage generating means, said first secondary winding being coupled in said high frequency voltage superposing path;

voltage boosting means for developing a boosted high frequency voltage in accordance with the high frequency voltage generated by said high frequency voltage generating means; and second converting means associated with said voltage boosting means for converting the boosted high frequency voltage into a third DC voltage that is higher than said second DC voltage and applying the third DC voltage between said output terminals.

2. The power supply apparatus according to claim 1 wherein said voltage boosting means is a second secondary winding of said coupling transformer.

3. A power supply apparatus comprising:

inverter means for converting a first DC voltage into a high frequency voltage;

transformer means for voltage-transforming said high frequency voltage;

first converting means for converting the voltage-transformed high frequency voltage into a second DC voltage;

two output terminals between which the second DC voltage from said first converting means is applied;

a high frequency voltage superposing path coupled between said output terminals;

high frequency voltage generating means;

a coupling transformer having a primary winding and a first secondary winding, said primary winding receiving a high frequency voltage from said high frequency voltage generating means, said first second winding being coupled in said high frequency voltage superposing path;

voltage boosting means for developing a boosted high frequency voltage in accordance with the high frequency voltage generated by said high frequency voltage generating means; and second converting means associated with said voltage boosting means for converting the boosted high frequency voltage into a third DC voltage and applying the third DC voltage between said output terminals;

wherein said high frequency voltage generating means stops providing the high frequency voltage when arc current flows between said output terminals.

4. A power supply apparatus comprising:

an inverter for converting a first DC voltage into a high frequency voltage;

a transformer for voltage-transforming said high frequency voltage;

a first converter for converting the voltage-transformed high frequency voltage into a second DC voltage;

two output terminals between which the second DC voltage from said first converter is applied;

a high frequency voltage superposing path coupled between said output terminals;

a high frequency voltage generator;

a coupling transformer having a primary winding and a first secondary winding, said primary winding receiving a high frequency voltage from said high frequency voltage generator, said first secondary winding being coupled in said high frequency voltage superposing path;

a voltage booster for developing a boosted high frequency voltage in accordance with the high frequency voltage generated by said high frequency voltage generator; and a second converter associated with said voltage booster for converting the boosted high frequency voltage into a third DC voltage that is higher than the second DC voltage and applying the third voltage between said output terminals.

5. The power supply apparatus according to claim 4 wherein said voltage booster is a second secondary winding of said coupling transformer.

6. A power supply apparatus comprising:

an inverter for converting a first DC voltage into a high frequency voltage;

a transformer for voltage-transforming said high frequency voltage;

a first converter for converting the voltage-transformed high frequency voltage into a second DC voltage;

two output terminals between which the second DC voltage from said first converter is applied;

a high frequency voltage superposing path coupled between said output terminals;

a high frequency voltage generator;

a coupling transformer having a primary winding and a first secondary winding, said primary winding receiving a high frequency voltage from said high frequency voltage generator, said first secondary winding being coupled in said high frequency voltage superposing path;

a voltage booster for developing a boosted high frequency voltage in accordance with the high frequency voltage generated by said high frequency voltage generator; and a second converter associated with said voltage booster for converting the boosted high frequency voltage into a third DC voltage and applying the third DC voltage between said output terminals;

wherein said high frequency voltage generator stops providing the high frequency voltage when arc current flows between said output terminals.

* * * * *